US012588048B2

(12) United States Patent
Zewail et al.

(10) Patent No.: US 12,588,048 B2
(45) Date of Patent: Mar. 24, 2026

(54) COLLISION HANDLING FOR MULTIPLE TRANSMIT RECEIVE POINTS

(71) Applicant: QUALCOMM Incorporated, San Diego, CA (US)

(72) Inventors: Ahmed Abdelaziz Ibrahim Abdelaziz Zewail, San Diego, CA (US); Jing Sun, San Diego, CA (US); Mostafa Khoshnevisan, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 384 days.

(21) Appl. No.: 18/189,877

(22) Filed: Mar. 24, 2023

(65) Prior Publication Data

US 2024/0323990 A1     Sep. 26, 2024

(51) Int. Cl.
*H04W 72/54*        (2023.01)
*H04L 5/00*         (2006.01)
*H04W 72/1263*      (2023.01)

(52) U.S. Cl.
CPC .......... *H04W 72/54* (2023.01); *H04L 5/0035* (2013.01); *H04W 72/1263* (2013.01)

(58) Field of Classification Search
None
See application file for complete search history.

(56) References Cited

U.S. PATENT DOCUMENTS

| 12,389,427 B2 * | 8/2025 | Sun | H04W 72/543 |
| 2018/0278387 A1 * | 9/2018 | Qi | H04W 72/27 |
| 2021/0360600 A1 | 11/2021 | Chendamarai Kannan et al. | |
| 2024/0324016 A1 * | 9/2024 | Zewail | H04W 72/535 |
| 2025/0151052 A1 * | 5/2025 | Matsumura | H04W 72/1268 |
| 2025/0167955 A1 * | 5/2025 | Matsumura | H04W 72/04 |
| 2025/0184085 A1 * | 6/2025 | Yue | H04L 5/0064 |

FOREIGN PATENT DOCUMENTS

| WO | WO-2017088927 A1 * | 6/2017 | .......... H04W 72/569 |
| WO | WO-2022011527 A1 | 1/2022 | |
| WO | WO-2022084976 A1 | 4/2022 | |

OTHER PUBLICATIONS

International Search Report and Written Opinion—PCT/US2024/020164—ISA/EPO—Jun. 28, 2024.

* cited by examiner

*Primary Examiner* — Anh Vu H Ly
(74) *Attorney, Agent, or Firm* — QUALCOMM Incorporated

(57) ABSTRACT

Various aspects of the present disclosure generally relate to wireless communication. In some aspects, a first transmit receive point (TRP) may receive an indication of a detection of a scheduling collision of a first scheduled communication of a first scheduling message from the first TRP and a second scheduled communication of a second scheduling message from a second TRP. The first TRP may back off from transmitting the first scheduled communication based at least in part on the indication. Numerous other aspects are described.

20 Claims, 13 Drawing Sheets

800 ⟶

700

706

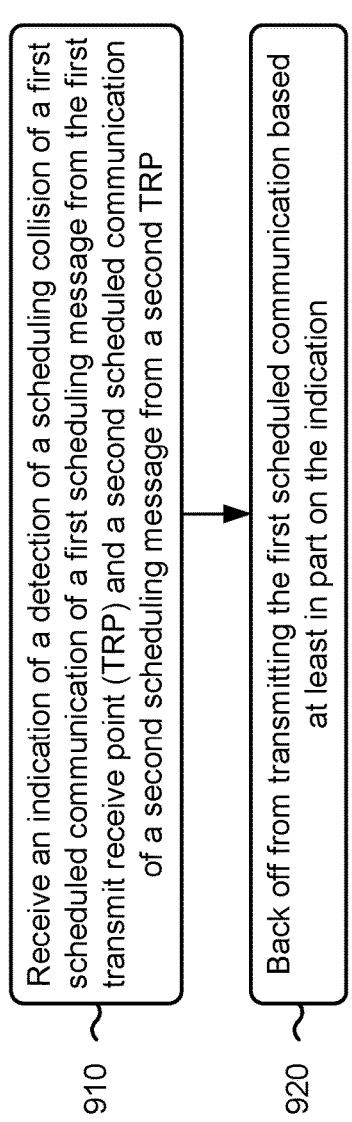

Receive an indication of a detection of a scheduling collision of a first scheduled communication of a first scheduling message from the first transmit receive point (TRP) and a second scheduled communication of a second scheduling message from a second TRP

910

Back off from transmitting the first scheduled communication based at least in part on the indication

1010 Generate a configuration that allows for a scheduling collision in which a first communication scheduled by the first TRP overlaps in time with a second communication scheduled by a second TRP 1020 Transmit the configuration

1000

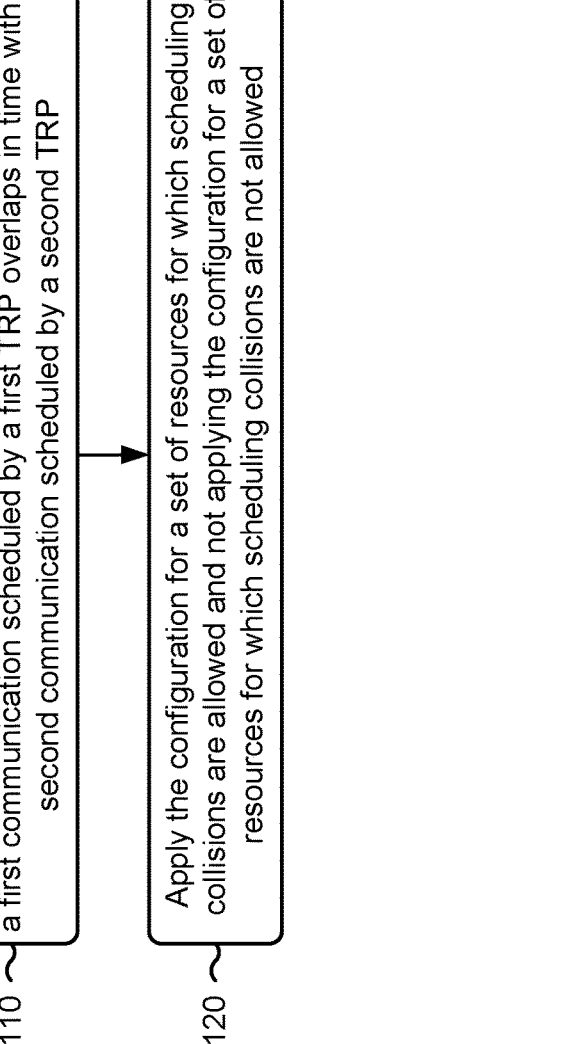

1110 Receive a configuration that allows for a scheduling collision in which a first communication scheduled by a first TRP overlaps in time with a second communication scheduled by a second TRP 1120 Apply the configuration for a set of resources for which scheduling collisions are allowed and not applying the configuration for a set of resources for which scheduling collisions are not allowed

COLLISION HANDLING FOR MULTIPLE TRANSMIT RECEIVE POINTS

FIELD OF THE DISCLOSURE

Aspects of the present disclosure generally relate to wireless communication and to techniques and apparatuses for handling collisions for multiple transmit receive points.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR. and other radio access technologies remain useful.

SUMMARY

Some aspects described herein relate to a method of wireless communication performed by a first transmit receive point (TRP) of a network entity. The method may include receiving an indication of a detection of a scheduling collision of a first scheduled communication of a first scheduling message from the first TRP and a second scheduled communication of a second scheduling message from a second TRP. The method may include backing off from transmitting the first scheduled communication based at least in part on the indication.

Some aspects described herein relate to a method of wireless communication performed by a first TRP of a network entity. The method may include generating a configuration that allows for a scheduling collision in which a first communication scheduled by the first TRP overlaps in time with a second communication scheduled by a second TRP. The method may include transmitting the configuration.

Some aspects described herein relate to a method of wireless communication performed by a user equipment (UE). The method may include receiving a configuration that allows for a scheduling collision in which a first communication scheduled by a first TRP overlaps in time with a second communication scheduled by a second TRP. The method may include applying the configuration for a set of resources for which scheduling collisions are allowed and not applying the configuration for a set of resources for which scheduling collisions are not allowed.

Some aspects described herein relate to a first TRP for wireless communication. The first TRP may include a memory and one or more processors coupled to the memory. The one or more processors may be configured to receive an indication of a detection of a scheduling collision of a first scheduled communication of a first scheduling message from the first TRP and a second scheduled communication of a second scheduling message from a second TRP. The one or more processors may be configured to back off from transmitting the first scheduled communication based at least in part on the indication.

Some aspects described herein relate to a first TRP for wireless communication. The first TRP may include a memory and one or more processors coupled to the memory. The one or more processors may be configured to generate a configuration that allows for a scheduling collision in which a first communication scheduled by the first TRP overlaps in time with a second communication scheduled by a second TRP. The one or more processors may be configured to transmit the configuration.

Some aspects described herein relate to a UE for wireless communication. The UE may include a memory and one or more processors coupled to the memory. The one or more processors may be configured to receive a configuration that allows for a scheduling collision in which a first communication scheduled by a first TRP overlaps in time with a second communication scheduled by a second TRP. The one or more processors may be configured to apply the configuration for a set of resources for which scheduling collisions are allowed and not applying the configuration for a set of resources for which scheduling collisions are not allowed.

Some aspects described herein relate to a non-transitory computer-readable medium that stores a set of instructions for wireless communication by a first TRP. The set of instructions, when executed by one or more processors of the first TRP, may cause the first TRP to receive an indication of a detection of a scheduling collision of a first scheduled communication of a first scheduling message from the first TRP and a second scheduled communication of a second scheduling message from a second TRP. The set of instructions, when executed by one or more processors of the first TRP, may cause the first TRP to back off from transmitting the first scheduled communication based at least in part on the indication.

Some aspects described herein relate to a non-transitory computer-readable medium that stores a set of instructions for wireless communication by a first TRP. The set of instructions, when executed by one or more processors of the first TRP, may cause the first TRP to generate a configuration that allows for a scheduling collision in which a first communication scheduled by the first TRP overlaps in time with a second communication scheduled by a second TRP. The set of instructions, when executed by one or more processors of the first TRP, may cause the first TRP to transmit the configuration.

Some aspects described herein relate to a non-transitory computer-readable medium that stores a set of instructions for wireless communication by a UE. The set of instructions, when executed by one or more processors of the UE, may cause the UE to receive a configuration that allows for a scheduling collision in which a first communication scheduled by a first TRP overlaps in time with a second communication scheduled by a second TRP. The set of instructions, when executed by one or more processors of the UE, may cause the UE to apply the configuration for a set of resources for which scheduling collisions are allowed and not applying the configuration for a set of resources for which scheduling collisions are not allowed.

Some aspects described herein relate to an apparatus for wireless communication. The apparatus may include means for receiving an indication of a detection of a scheduling collision of a first scheduled communication of a first scheduling message from the apparatus and a second scheduled communication of a second scheduling message from another apparatus. The apparatus may include means for backing off from transmitting the first scheduled communication based at least in part on the indication.

Some aspects described herein relate to an apparatus for wireless communication. The apparatus may include means for generating a configuration that allows for a scheduling collision in which a first communication scheduled by the apparatus overlaps in time with a second communication scheduled by another apparatus. The apparatus may include means for transmitting the configuration.

Some aspects described herein relate to an apparatus for wireless communication. The apparatus may include means for receiving a configuration that allows for a scheduling collision in which a first communication scheduled by a first TRP overlaps in time with a second communication scheduled by a second TRP. The apparatus may include means for applying the configuration for a set of resources for which scheduling collisions are allowed and not applying the configuration for a set of resources for which scheduling collisions are not allowed.

Aspects generally include a method, apparatus, system, computer program product, non-transitory computer-readable medium, UE, base station, TRP, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 9 is a diagram illustrating an example process performed, for example, by a first TRP, in accordance with the present disclosure.

FIG. 11 is a diagram illustrating an example process performed, for example, by a UE, in accordance with the present disclosure.

DETAILED DESCRIPTION

Figure 1:
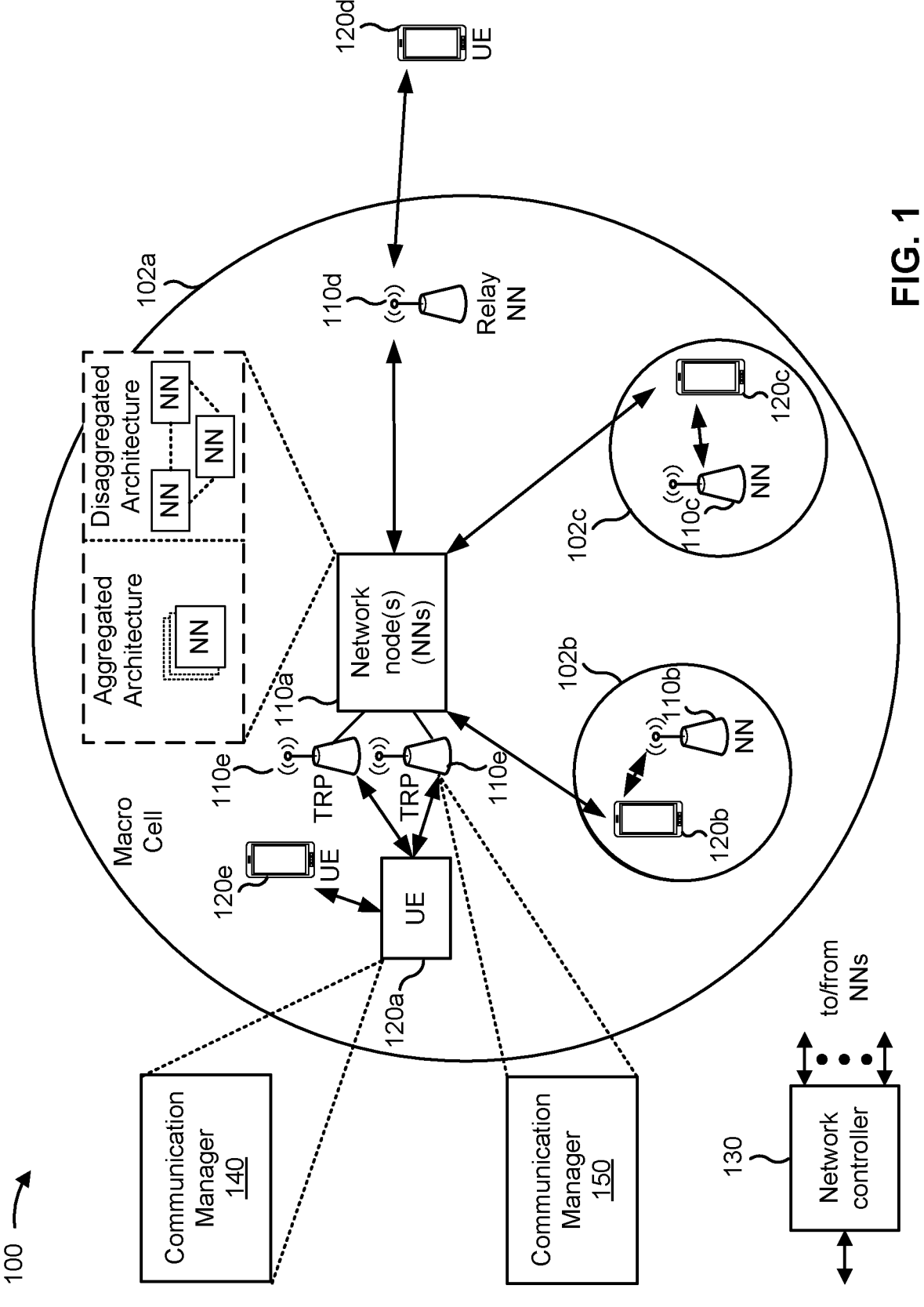
FIG. 1 is a diagram illustrating an example of a wireless network, in accordance with the present disclosure.

A user equipment (UE) may communicate with multiple transmit receive points (TRPs) that are controlled by a network entity. The multiple TRPs may coordinate to avoid collisions when scheduling communications and providing grants to UEs. In one scenario, the multiple TRPs may dynamically coordinate the use of resources to avoid collisions. The multiple TRPs may use a fast backhaul between TRPs. In another scenario, the multiple TRPs may use conservative scheduling with slow coordination. For example, if a UE cannot receive multiple unicast physical downlink shared channel (PDSCH) communications at the same time, the TRPs coordinate to communicate with the UE using time division multiplexing (TDM). One technique is for a first TRP to use even time slots and a second TRP to use odd time slots. This technique will work at the cost of the throughput, because if the first TRP does not use an even slot, the second TRP cannot use the even slot and the time slot is wasted. If many time slots are wasted, throughput decreases and latency increases. In either scenario, it is each TRP's responsibility to avoid a scheduling collision where one scheduled communication will overlap in time (e.g., same time slot) with another scheduled communication.

According to various aspects described herein, TRPs may not follow a requirement for inter-TRP coordination (e.g., orthogonality) and may allow for scheduling collisions at a UE. A scheduling collision may occur if a scheduled communication from a first TRP overlaps in time with a scheduled communication from a second TRP. A scheduling collision may occur if a serving operation exceeds a capability of the UE to transmit or receive a scheduled communication. In some aspects, the TRPs may schedule communications that overlap in time, and the UE may detect and indicate a scheduling collision. The UE may detect the scheduling collision based at least in part on scheduling messages (e.g., downlink control information (DCI) in a physical downlink control channel message (PDCCH), a radio resource control (RRC) configuration) from the multiple TRPs. A TRP may handle the scheduling collisions. For example, the TRP may delay transmission of the first scheduled communication based at least in part on receiving the indication. This may include delaying transmission of the first scheduled communication based at least in part on a configured backoff window, a random backoff value within the backoff window, or a state of a backoff window state machine. Backing off may include refraining from transmitting the scheduled communication or rescheduling the first scheduled communication. By allowing for scheduling collisions from multiple TRPs and having TRPs back off from scheduled transmissions when necessary, a UE may not be blocked from using a resource for a first TRP that is reserved by a second TRP. More time slots are used and less signaling resources are wasted. This improves the throughput for multiple TRPs and decreases latency.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, a network node 110*d*, and a network node 110*c*), a UE 120 or multiple UEs 120 (shown as a UE 120*a*, a UE 120*b*, a UE 120*c*, a UE 120*d*, and a UE 120*c*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a TRP, a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like. The network node 110*a* may control one or more TRPs (e.g., network node 110*e*) for communication with a UE 120.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*c*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V21) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR4a or FR4-1 (52.6 GHZ-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a first TRP (e.g., network node 110*c*) may include a communication manager 150. As described in more detail elsewhere herein, the communication manager 150 may receive an indication of a detection of a scheduling collision of a first scheduled communication of a first scheduling message from the first TRP and a second scheduled communication of a second scheduling message from a second TRP. The communication manager 150 may back off from transmitting the first scheduled communication based at least in part on the indication.

In some aspects, the communication manager 150 may generate a configuration that allows for a scheduling collision in which a first communication scheduled by the first TRP overlaps in time with a second communication scheduled by a second TRP. The communication manager 150 may transmit the configuration. Additionally, or alternatively, the communication manager 150 may perform one or more other operations described herein.

In some aspects, a UE (e.g., a UE 120) may include a communication manager 140. As described in more detail elsewhere herein, the communication manager 140 may receive a configuration that allows for a scheduling collision in which a first communication scheduled by a first TRP overlaps in time with a second communication scheduled by a second TRP. The communication manager 140 may apply the configuration for a set of resources for which scheduling collisions are allowed and not applying the configuration for a set of resources for which scheduling collisions are not allowed. Additionally, or alternatively, the communication manager 140 may perform one or more other operations described herein.

As indicated above, FIG. 1 is provided as an example. Other examples may differ from what is described with regard to FIG. 1.

Figure 2:
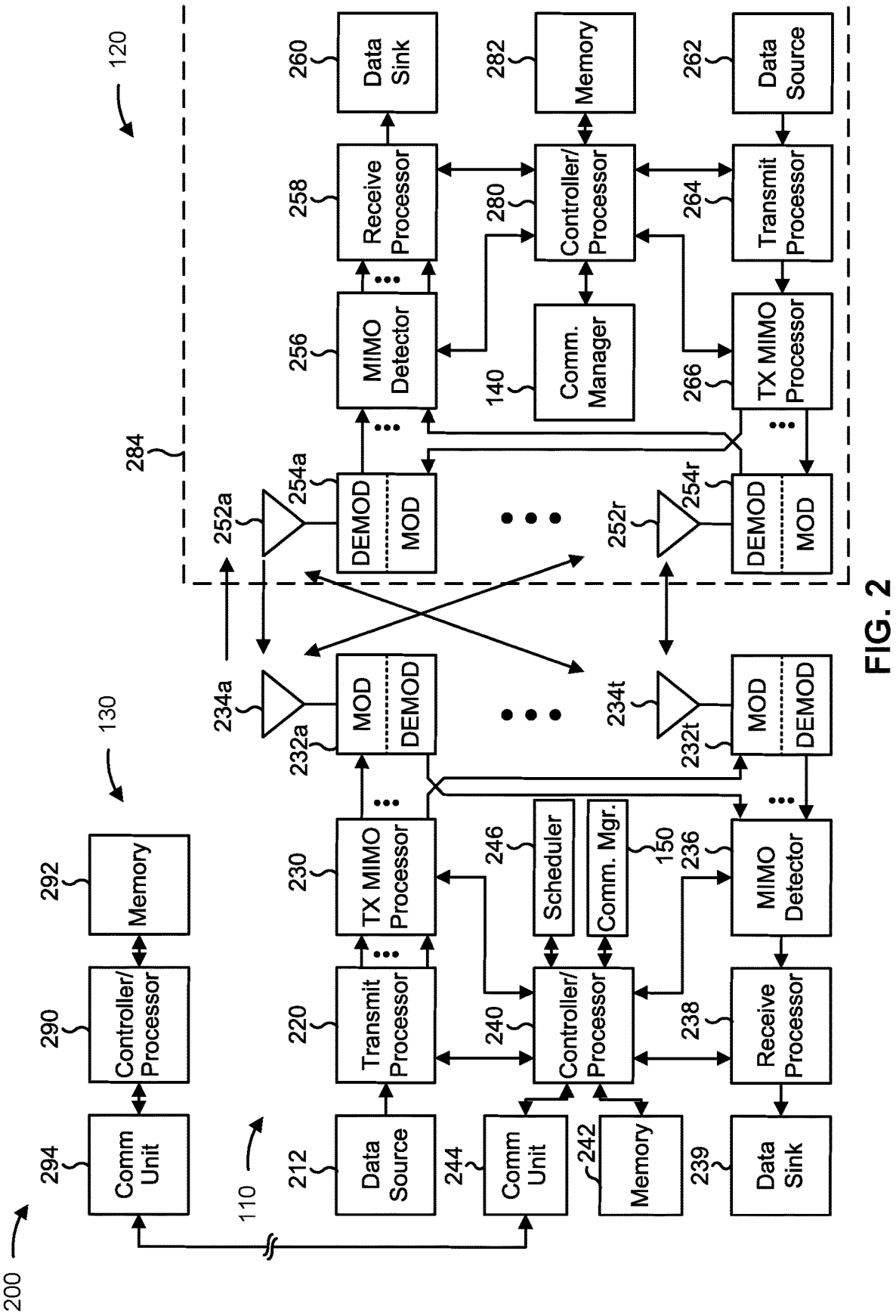
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 2-13).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 2-13).

A controller/processor of a network entity (e.g., controller/processor 240 of the network node 110), the controller/processor 280 of the UE 120, and/or any other component(s) of FIG. 2 may perform one or more techniques associated with handling scheduling collisions with multiple TRPs, as described in more detail elsewhere herein. For example, the controller/processor 240 of the network node 110, the controller/processor 280 of the UE 120, and/or any other component(s) of FIG. 2 may perform or direct operations of, for example, process 900 of FIG. 9, process 1000 of FIG. 10, process 11 of FIG. 11, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9. process 1000 of FIG. 10, process 11 of FIG. 11, and/or other processes as described herein. In some examples, executing instructions may include running the instructions, converting the instructions, compiling the instructions, and/or interpreting the instructions, among other examples.

In some aspects, a UE (e.g., a UE 120) includes means for receiving a first scheduling message from a first TRP and a second scheduling message from a second TRP; means for detecting a scheduling collision based at least in part on a first scheduled communication of the first scheduling message and a second scheduled communication of the second scheduling message overlapping in time; and/or means for transmitting an indication of the scheduling collision. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a UE (e.g., a UE 120) includes means for receiving a configuration that allows for a scheduling collision in which a first communication scheduled by a first TRP overlaps in time with a second communication scheduled by a second TRP; and/or means for applying the configuration for a set of resources for which scheduling collisions are allowed and not applying the configuration for a set of resources for which scheduling collisions are not allowed. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a first TRP (e.g., a network node 110e) includes means for receiving an indication of a detection of a scheduling collision of a first scheduled communication of a first scheduling message from the first TRP and a second scheduled communication of a second scheduling message from a second TRP; and/or means for backing off from transmitting the first scheduled communication based at least in part on the indication. The means for the first TRP to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a first TRP (e.g., a network node 110e) includes means for generating a configuration that allows for a scheduling collision in which a first communication scheduled by the first TRP overlaps in time with a second communication scheduled by a second TRP; and/or means for transmitting the configuration. The means for the first TRP to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU. DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
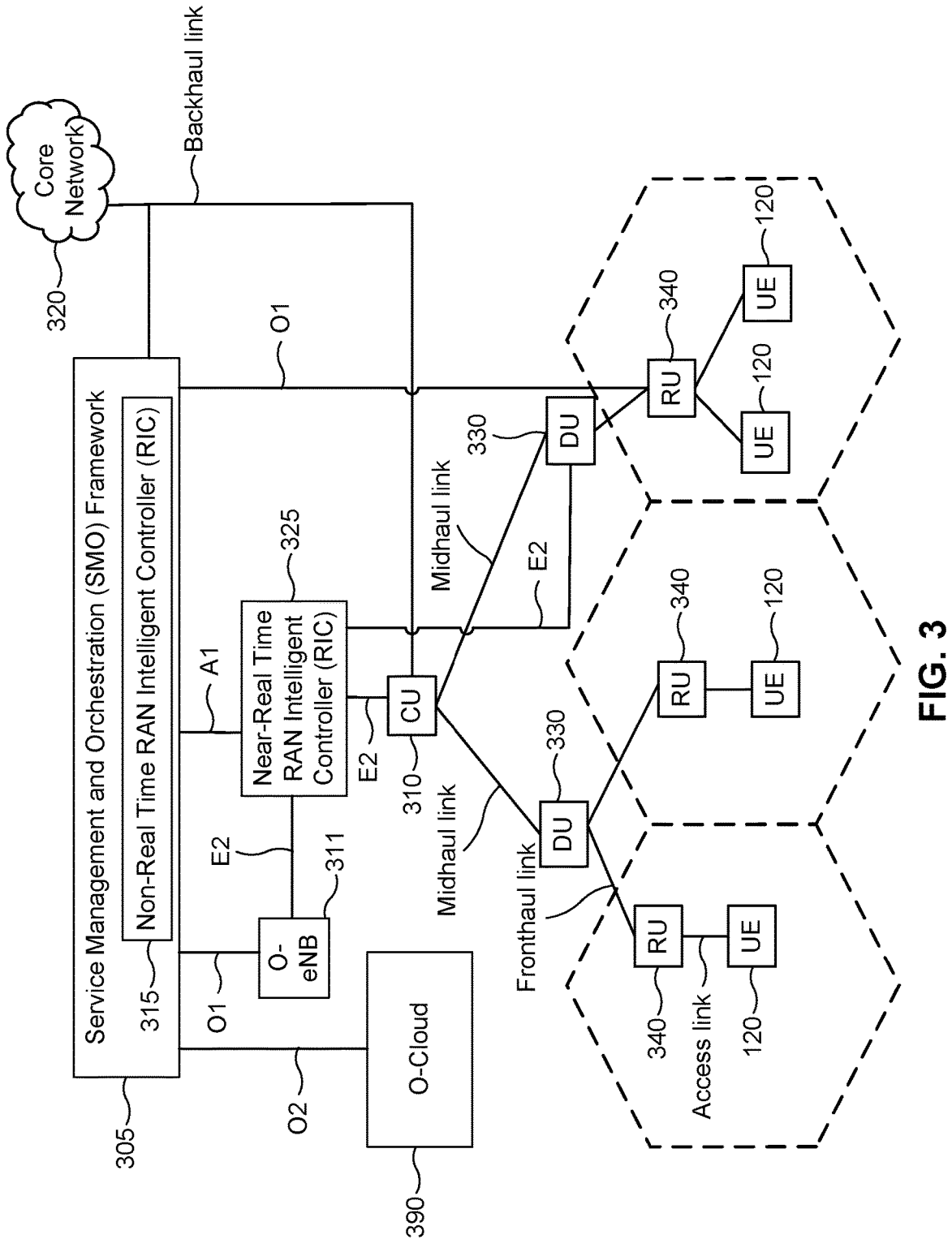
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include RRC functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
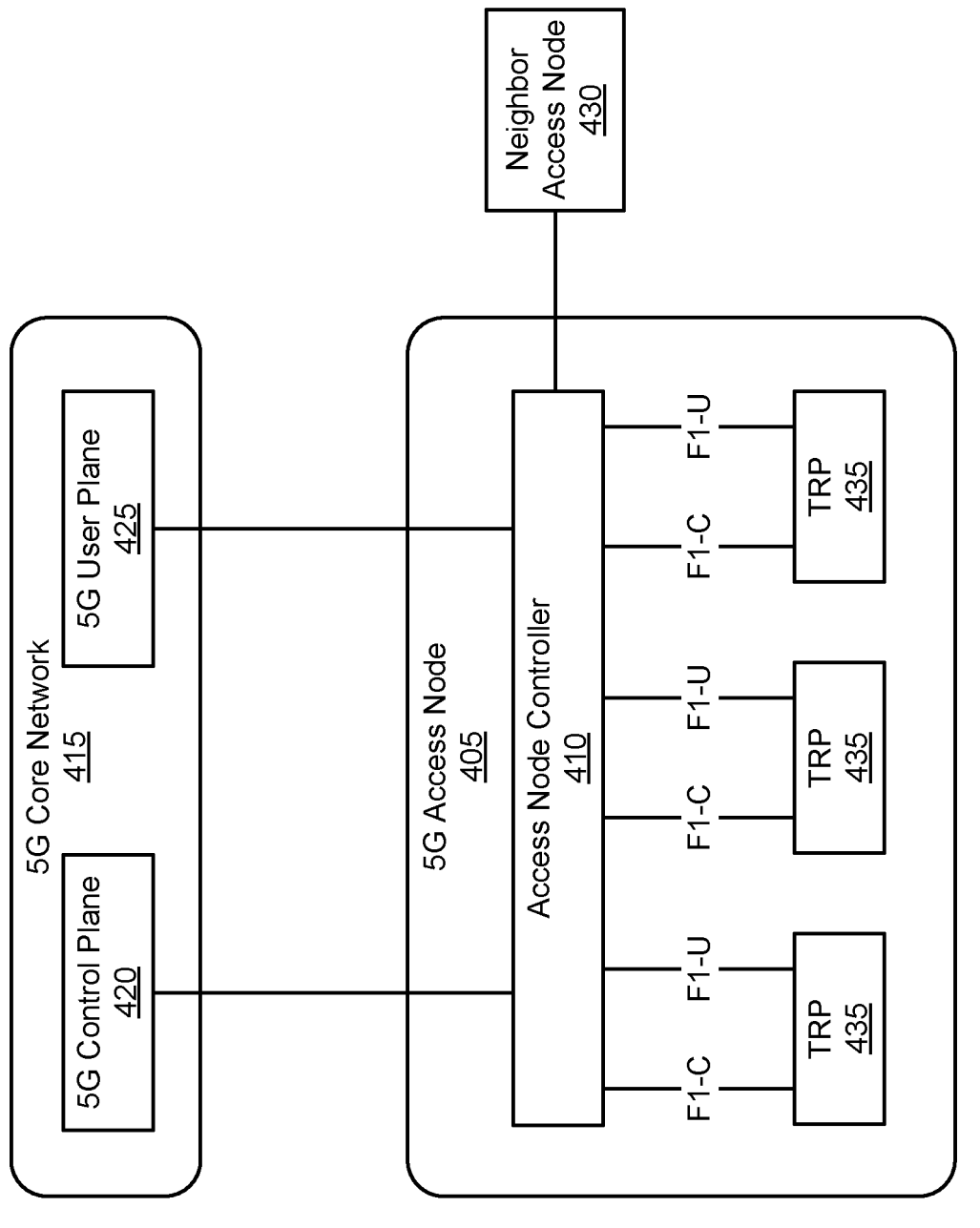
FIG. 4 illustrates an example logical architecture of a distributed random access network, in accordance with the present disclosure.

FIG. 4 illustrates an example logical architecture of a distributed RAN 400, in accordance with the present disclosure.

A 5G access node 405 may include an access node controller 410. The access node controller 410 may be a CU of the distributed RAN 400. In some aspects, a backhaul interface to a 5G core network 415 may terminate at the access node controller 410. The 5G core network 415 may include a 5G control plane component 420 and a 5G user plane component 425 (e.g., a 5G gateway), and the backhaul interface for one or both of the 5G control plane and the 5G user plane may terminate at the access node controller 410. Additionally, or alternatively, a backhaul interface to one or more neighbor access nodes 430 (e.g., another 5G access node 405 and/or an LTE access node) may terminate at the access node controller 410.

The access node controller 410 may include and/or may communicate with one or more TRPs 435 (e.g., via an F1 Control (F1-C) interface and/or an F1 User (F1-U) interface). A TRP 435 (e.g., network node 110c) may include a DU and/or a RU of the distributed RAN 400. In some aspects, a TRP 435 may correspond to a network node 110 described above in connection with FIG. 1. For example, different TRPs 435 may be included in different network nodes 110. Additionally, or alternatively, multiple TRPs 435 may be included in a single network node 110. In some aspects, a network node 110 may include a CU (e.g., access node controller 410) and/or one or more DUs (e.g., one or more TRPs 435). In some cases, a TRP 435 may be referred to as a cell, a panel, an antenna array, or an array.

A TRP 435 may be connected to a single access node controller 410 or to multiple access node controllers 410. In some aspects, a dynamic configuration of split logical functions may be present within the architecture of distributed RAN 400, referred to elsewhere herein as a functional split. For example, a PDCP layer, an RLC layer, and/or a MAC layer may be configured to terminate at the access node controller 410 or at a TRP 435.

In some aspects, multiple TRPs 435 may transmit communications (e.g., the same communication or different communications) in the same transmission time interval (TTI) (e.g., a slot, a mini-slot, a subframe, or a symbol) or different TTIs using different quasi co-location (QCL) relationships (e.g., different spatial parameters, different transmission configuration indicator (TCI) states, different precoding parameters, and/or different beamforming parameters). In some aspects, a TCI state may be used to indicate one or more QCL relationships. A TRP 435 may be configured to individually (e.g., using dynamic selection) or jointly (e.g., using joint transmission with one or more other TRPs 435) serve traffic to a UE 120.

As indicated above, FIG. 4 is provided as an example. Other examples may differ from what was described with regard to FIG. 4.

Figure 5:
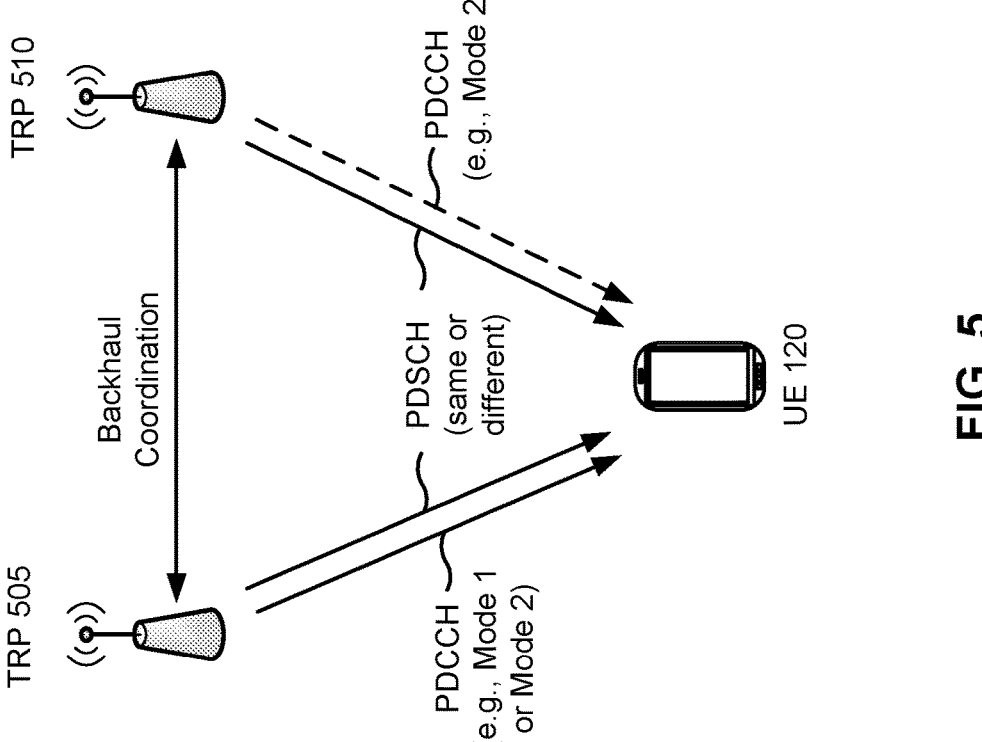
FIG. 5 is a diagram illustrating an example of multiple transmit receive point (TRP) communication, in accordance with the present disclosure.

FIG. 5 is a diagram illustrating an example 500 of multi-TRP communication (sometimes referred to as multi-panel communication), in accordance with the present disclosure. As shown in FIG. 5, multiple TRPs may communicate with the same UE 120. A TRP may correspond to a TRP 435 described above in connection with FIG. 4.

The multiple TRPs (shown as TRP 505 and TRP 510) may communicate with the same UE 120 in a coordinated manner (e.g., using coordinated multipoint transmissions) to improve reliability and/or increase throughput. The TRPs may coordinate such communications via an interface between the TRPs (e.g., a backhaul interface and/or an access node controller 410). The interface may have a smaller delay and/or higher capacity when the TRPs are co-located at the same network node 110 (e.g., when the TRPs are different antenna arrays or panels of the same network node 110), and may have a larger delay and/or lower capacity (as compared to co-location) when the TRPs are located at different network nodes 110. The different TRPs may communicate with the UE 120 using different QCL relationships (e.g., different TCI states), different DMRS ports, and/or different layers (e.g., of a multi-layer communication).

In a first multi-TRP transmission mode (e.g., Mode 1), a single PDCCH may be used to schedule downlink data communications for a single PDSCH. In this case, multiple TRPs (e.g., TRP 505 and TRP 510) may transmit communications to the UE 120 on the same PDSCH. For example, a communication may be transmitted using a single codeword with different spatial layers for different TRPs (e.g., where one codeword maps to a first set of layers transmitted by TRP 505 and maps to a second set of layers transmitted by TRP 510). As another example, a communication may be transmitted using multiple codewords, where different codewords are transmitted by different TRPs (e.g., using different sets of layers). In either case, different TRPs may use different QCL relationships (e.g., different TCI states) for different DMRS ports corresponding to different layers. For example, TRP 505 may use a first QCL relationship or a first TCI state for a first set of DMRS ports corresponding to a first set of layers, and TRP 510 may use a second (different) QCL relationship or a second (different) TCI state for a second (different) set of DMRS ports corresponding to a second (different) set of layers. In some aspects, a TCI state in DCI (e.g., transmitted on the PDCCH, such as DCI format 1_0 or DCI format 1_1) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1).

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by TRP 505, and a second PDCCH may schedule a second codeword to be transmitted by TRP 510. Furthermore, first DCI (e.g., transmitted by TRP 505) may schedule a first PDSCH communication associated with a first set of DMRS ports with a first QCL relationship (e.g., indicated by a first TCI state) for TRP 505, and second DCI (e.g., transmitted by TRP 510) may schedule a second PDSCH communication associated with a second set of DMRS ports with a second QCL relationship (e.g., indicated by a second TCI state) for TRP 510. In this case, DCI (e.g., having DCI format 1_0 or DCI format 1_1) may indicate a corresponding TCI state for a TRP corresponding to the DCI. The TCI field of a DCI indicates the corresponding TCI state (e.g., the TCI field of the first DCI indicates the first TCI state and the TCI field of the second DCI indicates the second TCI state).

The multiple TRPs may coordinate to avoid collisions when scheduling communications and providing grants to UEs. In one scenario, the multiple TRPs may dynamically coordinate the use of resources to avoid collisions. The multiple TRPs may use a fast backhaul between TRPs. In another scenario, the multiple TRPs may use conservative scheduling with slow coordination (e.g., RRC level). For example, if a UE cannot receive multiple unicast PDSCH communications at the same time, the TRPs coordinate to communicate with the UE using TDM. One technique is for TRP 505 to use even time slots and TRP 510 to use odd time slots. This technique will work, but at the cost of the throughput, because if TRP 505 does not use an even slot, TRP 510 cannot use the even slot and the time slot is wasted. If many time slots are wasted, throughput decreases and latency increases. In either scenario, it is each TRP's responsibility to avoid a scheduling collision, which is when one scheduled communication will overlap in time (e.g., same time slot) with another scheduled communication.

As indicated above, FIG. 5 is provided as an example. Other examples may differ from what is described with respect to FIG. 5.

Figure 6:
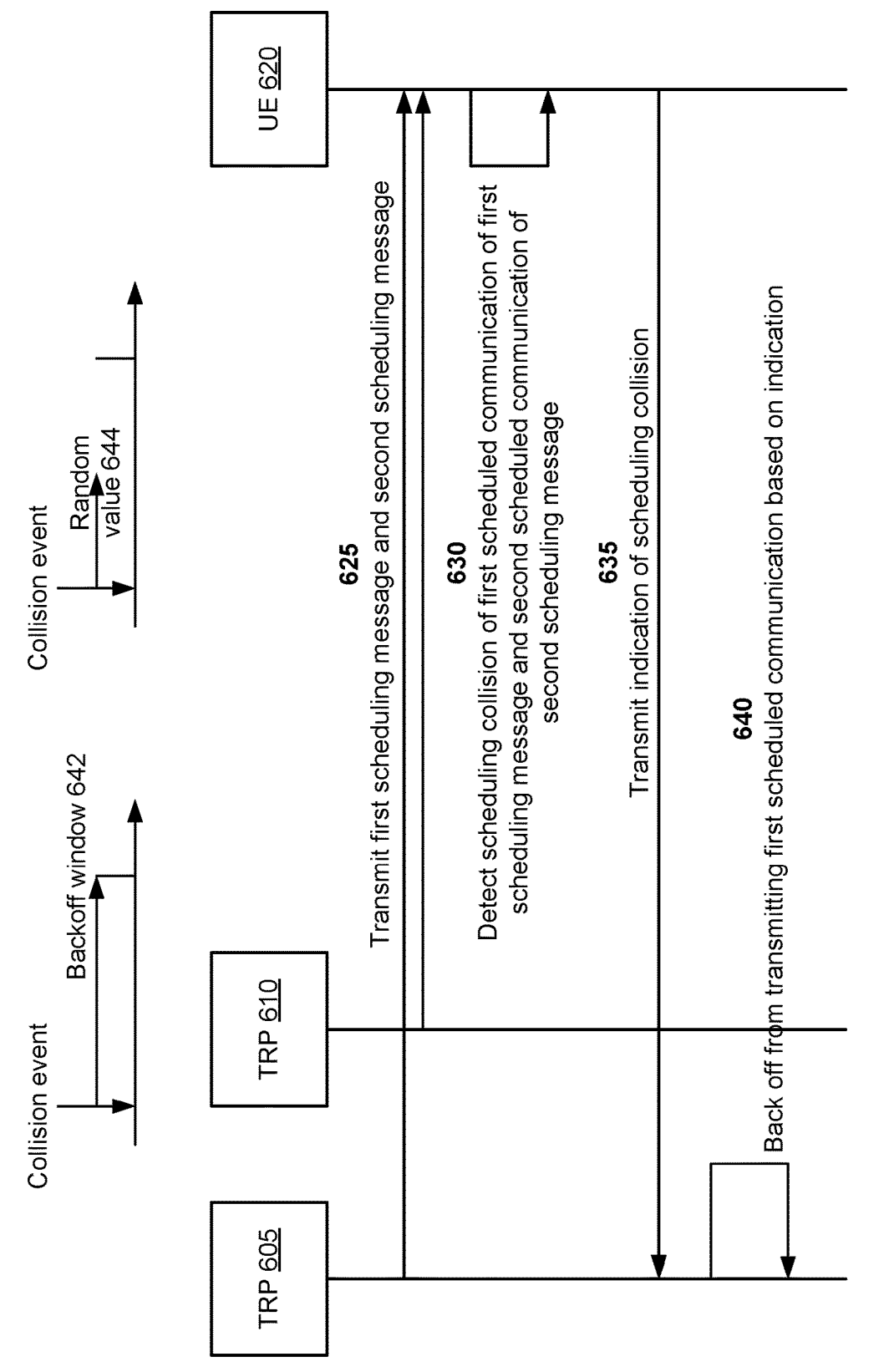
FIG. 6 is a diagram illustrating an example associated with detecting and handling scheduling collisions, in accordance with the present disclosure.

FIG. 6 is a diagram illustrating an example 600 associated with detecting and handling scheduling collisions, in accordance with the present disclosure. As shown in FIG. 6, a first TRP 605 (e.g., TRP 435, TRP 505) and a second TRP 610 (e.g., TRP 435, TRP 510) of a network entity (e.g., network node 110) may communicate with a UE 620 (e.g., a UE 120) in a wireless communication network (e.g., wireless network 100).

According to various aspects described herein, TRPs may not follow a requirement for inter-TRP coordination (e.g., orthogonality) and may allow for scheduling collisions at UEs. A scheduling collision may occur if a scheduled communication from a first TRP overlaps in time with a scheduled communication from a second TRP. A scheduling collision may occur if a serving operation exceeds a capability of the UE to transmit or receive a scheduled communication. In some aspects, the TRPs may schedule communications that overlap in time and a UE may detect and indicate a collision. The UE may detect a scheduling collision based at least in part on scheduling messages (e.g., DCI in a PDCCH communication) from multiple TRPs. A TRP may handle the scheduling collision. For example, the TRP may delay transmission of the first scheduled communication based at least in part on receiving the indication. This may include delaying transmission of the first scheduled communication based at least in part on a configured backoff window, a random backoff value within the backoff window, or a state of a backoff window state machine. Backing off may include refraining from transmitting the scheduled communication or rescheduling the first scheduled communication.

By allowing for scheduling collisions from multiple TRPs and having TRPs back off from scheduled transmission when necessary, a UE may not be blocked from using a resource for a first TRP that is reserved by a second TRP. More time slots are used and less signaling resources are wasted. This improves the throughput for multiple TRPs and reduced latency.

As shown by reference number 625, TRP 605 may transmit a first scheduling message and TRP 610 may transmit a second scheduling message. The first scheduling message may include DCI in a physical uplink control channel (PUCCH) communication or an RRC message that schedules a configured grant (CG) occasion, a semi-persistent scheduling (SPS) occasion, or a periodic resource. The second scheduling message may include DCI in a PUCCH occasion or an RRC message that schedules a CG occasion, an SPS occasion, or a periodic resource. The UE 620 may receive the first scheduling message and the second scheduling message. The UE 620 may be configured to expect that scheduling collisions can occur between multiple TRPs, such as between TRP 605 and TRP 610. The scheduling message (e.g., the first scheduling message and/or the second scheduling message) may be for a downlink PDSCH communication, an uplink physical uplink shared channel (PUSCH) communication, or an uplink PUCCH communication.

In some aspects, the first scheduling message may include a first DCI (e.g., in a first PDCCH communication) and the second schedule messaging may include a second DCI (e.g., in a second PDCCH communication). In some aspects, the first scheduling message may include a first RRC message and the second schedule messaging may include a second RRC message. The first RRC message may configure the UE 620 with a first configuration, such as a CG configuration or an SPS configuration. The second RRC message may configure the UE 620 with a second configuration, such as a CG configuration or an SPS configuration. In some aspects, the UE 620 may receive a DCI from a TRP that overrides a previous RRC configuration for the TRP. The scheduling messages may indicate uplink grants and/or downlink grants.

As shown by reference number 630, the UE 620 may detect a scheduling collision of a first scheduled communication of the first scheduling message and a second scheduled communication of the second scheduling message. The scheduling collision may occur if the first scheduled communication and the second scheduled communication are to overlap in time, such as in the same time slot. The UE 620 may detect the scheduling collision by comparing the scheduling messages. For example, by comparing a timing (e.g., granted time resource) of the first scheduled communication indicated by a first DCI and a timing of the second scheduled communication indicated by a second DCI, the UE 620 may detect a scheduling collision from the DCIs.

In some aspects, the UE 620 may detect a scheduling collision further based at least in part on a capability of the UE for handling messages that overlap in time. For example, the UE 620 may receive two scheduling messages from TRP 605 and TRP 610 for scheduled communications that overlap in time, but can be frequency division multiplexed (FDMed). However, if the scheduled communications have a total rank of 4 and the UE 620 has a capability of a maximum rank of 3, the UE 620 cannot handle both scheduled communications, and there will be a scheduling collision.

An example of a scheduling collision that exceeds a UE capability may include receiving two unicast PDSCH communications at the same time. The UE 620 may, as a scheduling event, receive DCIs from TRPs that schedule two time overlapping PDSCH communications. The UE 620 may not have a capability to receive two partially overlapping unicast PDSCH communications. Another example of a scheduling collision that exceeds a UE capability may include transmitting simultaneous PUCCH communications at the same time. The UE 620 may, as a scheduling event, receive DCIs from TRPs that schedule two time overlapping PUCCH communications. Scheduling messages may or may not collide with the scheduled communications (e.g., DCI).

In some aspects, the UE 620 may drop (e.g., refrain from transmitting) or downgrade a scheduled PDSCH communication affected by a scheduling collision. Downgrading may include modulating or demodulating parts of a scheduled communication that are not overlapping with another scheduled communication, and not modulating or demodulating parts of a scheduled communication that are overlapping with another scheduled communication. As shown by reference number 635, the UE 620 may transmit an indication of the scheduling collision. The indication may include a collision report.

TRP 605 may receive the indication. As shown by reference number 640, TRP 605 may back off from transmitting the first scheduled communication based at least in part on the indication. Backing off may include delaying the first scheduled communication for a configured time duration. Backing off may include refraining from transmitting the first scheduled communication. Backing off may take into consideration that the traffic is bursty. If there is a collision at a certain time, which means the traffic density from both TRPs is too high, the traffic density may reduce, and no backoff is needed. Backing off, more generally, may involve some restrictions that are applied to scheduling.

In some aspects, TRP 605 may delay transmission of the first scheduled communication based at least in part on a configured backoff window. The configured backoff window may start at a collision event (e.g., receiving indication of detection of a scheduling collision, estimation of scheduling collision by algorithm or heuristics, not receiving a PUCCH communication). A collision event may include detection of colliding scheduling communications or estimation of colliding scheduling communications. The configured backoff window may be a time duration that is fixed, such as fixed window 642 in example 600. TRP 605 may refrain from transmitting the first scheduled communication during the backoff window and transmit the first scheduled communication after the backoff window expires. TRP 605 may obtain a time duration of the backoff window in an RRC configuration from another TRP or from a network entity that controls the TRP. The time duration may be specified in and obtained from stored configuration information.

In some aspects, TRP 605 may back off from transmitting the first scheduled communication based at least in part on a random value 644 for backoff. The random value 644 may be within a configured backoff window. TRP 605 may select the random value. TRP 605 may select a random number (uniformly) from between a backoff window minimum value and a backoff window maximum value.

In some aspects, backing off from transmitting the first scheduled communication may include rescheduling the first scheduled communication with a lower rank than a rank originally associated with the first scheduling message. Backing off may include rescheduling the first scheduled communication with fewer frequency domain resources than granted by the first scheduling message. Backing off may include adding other restrictions or reducing resources used for the first scheduled communication.

By backing off a scheduled transmission based on a scheduling collision, TRP 605 and TRP 610 may improve retransmissions and other communications, and the UE 620 may not be blocked from using a resource for a TRP that is reserved by another TRP. More time slots are used and less signaling resources are wasted. This improves the throughput for multiple TRPs.

As indicated above, FIG. 6 is provided as an example. Other examples may differ from what is described with respect to FIG. 6.

Figure 7:
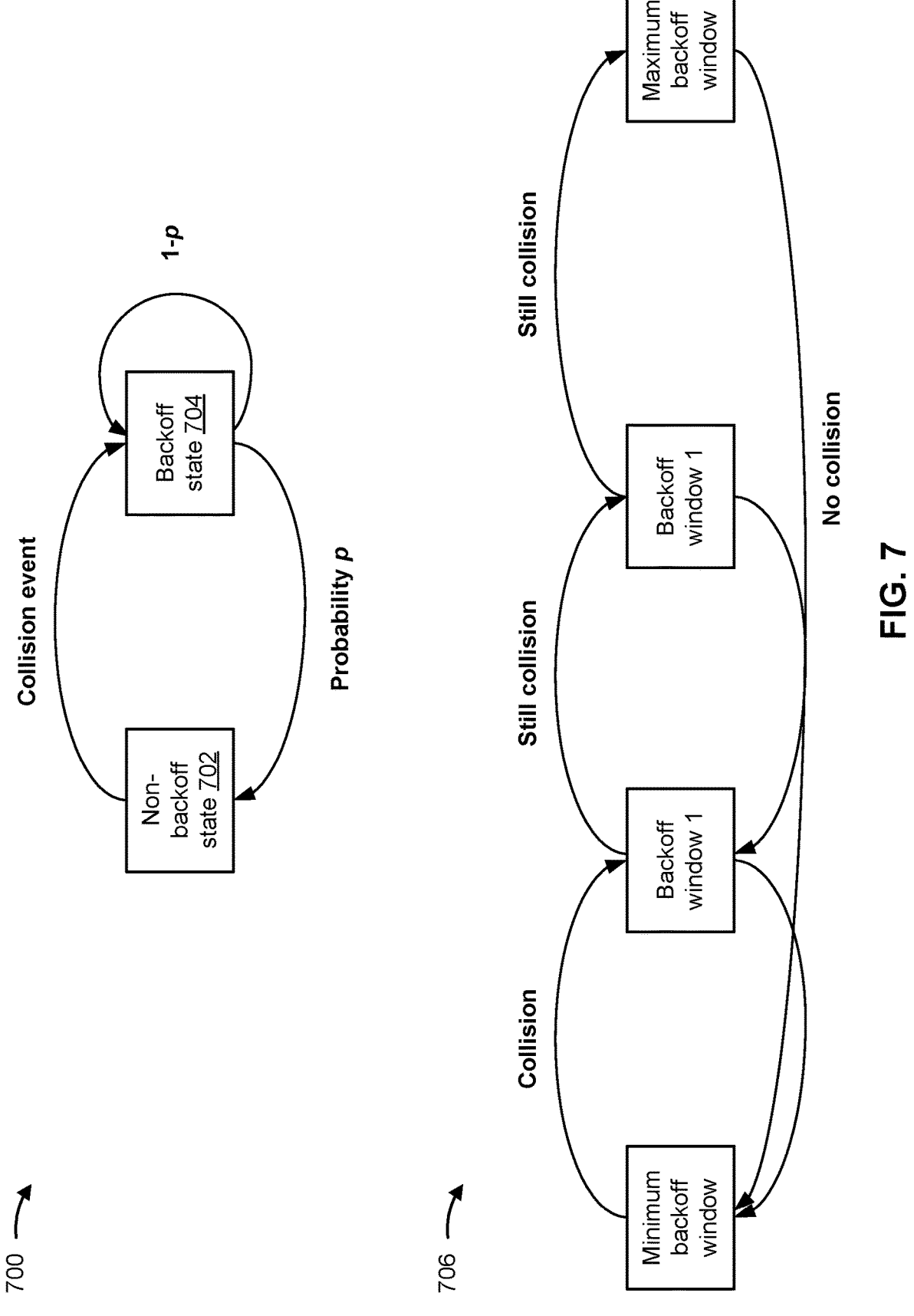
FIG. 7 is a diagram illustrating examples of a backoff window state machine, in accordance with the present disclosure.

FIG. 7 is a diagram illustrating examples 700 and 706 of a backoff window state machine, in accordance with the present disclosure.

In some aspects, TRP 605 may back off from transmitting a first scheduled communication based at least in part on a state machine for a backoff window. Example 700 shows that TRP 605 may operate in a non-backoff state 702 and then switch to a backoff state 704 based at least in part on a collision event, such as receiving the indication of a scheduling collision. TRP 605 may later switch back to the non-backoff state 702 based at least in part on a probability p. The probability p may be a configured value that represents the likelihood that TRP 605 is clear to transmit the first scheduled communication. TRP 605 may remain in the backoff state 704 based at least in part on 1−p, or the likelihood that TRP 605 is not clear to transmit the first scheduled communication.

Example 706 shows a backoff state machine that increases the size of the backoff window if there is a persistent collision. TRP 605 may maintain the size of the backoff window size from a set of window sizes. The actual backoff time may be selected in the backoff window. This may include selecting a value at random, drawn from a uniform distribution (0, maximum backoff length). In some aspects, the backoff window size may be the state of the backoff state machine. TRP 605 may increase the size of the backoff window based at least in part on an indication of a scheduling collision. TRP 605 may increase the size of the backoff window based at least in part on the collision density (quantity per time duration) satisfying a density threshold (e.g., greater than or equal to a maximum quantity of collisions with a time duration). TRP 605 may decrease the size of the backoff window based at least in part on there being no collision or if the collision density does not satisfy the density threshold.

As indicated above, FIG. 7 provides some examples. Other examples may differ from what is described with regard to FIG. 7.

Figure 8:
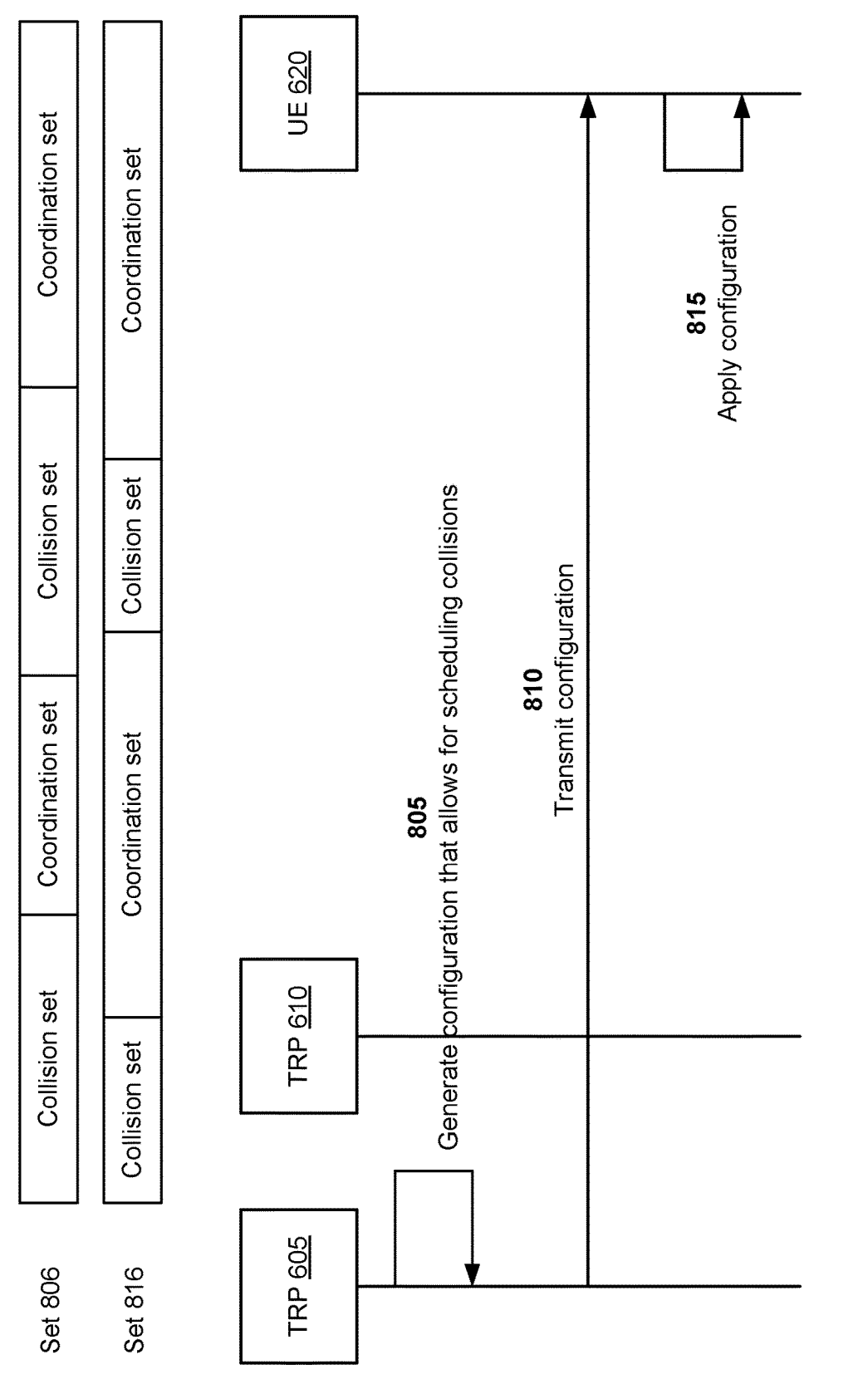
FIG. 8 is a diagram illustrating an example of configuring a UE to expect scheduling collisions, in accordance with the present disclosure.

FIG. 8 is a diagram illustrating an example 800 of configuring a UE to expect scheduling collisions, in accordance with the present disclosure.

In some aspects, a resource pattern (e.g., time pattern, slot pattern) may be configured for the allowance of scheduling collisions. The resource pattern may include one or more coordination sets where scheduling collisions are not allowed and one or more collision sets where scheduling collisions are allowed. In each coordination set, where the throughput is sacrificed to avoid collisions, each TRP may use a subset of resources to serve the UE such that there is no collision. In a collision set, scheduling collisions are allowed, which provides a potentially higher throughput and reduces latency.

A network entity (e.g., network node 110) may control the assignment of collision sets and coordination sets as part of a tradeoff of a collision probability and the trunking efficiency. The network entity may configure a TRP (e.g., TRP 605) with collision sets and coordination sets.

Example 800 shows TRP 605 configuring the UE 620. As shown by reference number 805, TRP 605 may generate a configuration for allowing scheduling collisions. The configuration may indicate slots for the collisions sets and coordination sets, as shown by set 806. The configuration may indicate a starting slot and/or an ending slot for either a collision set or a coordination set. As shown by reference number 810, TRP 605 may transmit a configuration to the UE 620 that indicates the collision sets and the coordination sets. TRP 605 may transmit the configuration via RRC signaling.

As shown by reference number 815, the UE 620 may apply the configuration. For example, for collision sets, the UE 620 may detect and handle scheduling collisions as described in connection with FIG. 7.

In some aspects, the UE 620 may have multiple collision events, including at the same time. To handle the multiple collision events, the configuration may indicate a single set, such as set 806, that defines collision sets and coordination sets that apply to all collision events. Alternatively, in some aspects, the configuration may indicate separate sets for separate collision events, such as both set 806 and set 816. That is, there may be a set for each collision event. Each set may be configured for multiple collision events. In some aspects, TRP 605 may back off of scheduled communications only within the collision sets. Collision handling is not expected during the coordination sets.

In some aspects, TRP 605 may use a backoff timer during a collision set. The backoff timer may be associated with a backoff counter that counts down only during the collision set and when the backoff timer is running. Alternatively, the backoff counter may continue to count down during the backoff timer in all slots, but any collision handling is to be applied in collision set slots.

By confining scheduling collisions to a collision set. TRP 605 may have more flexibility in allowing scheduling collisions and may better manage the throughput to conserve signaling resources.

As indicated above, FIG. 8 is provided as an example. Other examples may differ from what is described with regard to FIG. 8.

FIG. 9 is a diagram illustrating an example process 900 performed, for example, by a first TRP, in accordance with the present disclosure. Example process 900 is an example where the first TRP (e.g., network node 110e, TRP 605) performs operations associated with collision handling for multiple TRPs.

As shown in FIG. 9, in some aspects, process 900 may include receiving an indication of a detection of a scheduling collision of a first scheduled communication of a first scheduling message from the first TRP and a second scheduled communication of a second scheduling message from a second TRP (block 910). For example, the first TRP (e.g., using reception component 1202 and/or communication manager 1206, depicted in FIG. 12) may receive an indication of a detection of a scheduling collision of a first scheduled communication of a first scheduling message from the first TRP and a second scheduled communication of a second scheduling message from a second TRP, as described above.

As further shown in FIG. 9, in some aspects, process 900 may include backing off from transmitting the first scheduled communication based at least in part on the indication (block 920). For example, the first TRP (e.g., using communication manager 1206, depicted in FIG. 12) may back off from transmitting the first scheduled communication based at least in part on the indication, as described above.

Process 900 may include additional aspects, such as any single aspect or any combination of aspects described below and/or in connection with one or more other processes described elsewhere herein.

In a first aspect, backing off from transmitting includes delaying transmission of the first scheduled communication.

In a second aspect, alone or in combination with the first aspect, delaying transmission of the first scheduled communication includes delaying transmission of the first scheduled communication based at least in part on a configured backoff window.

In a third aspect, alone or in combination with one or more of the first and second aspects, process 900 includes increasing or decreasing the configured backoff window.

In a fourth aspect, alone or in combination with one or more of the first through third aspects, delaying transmission of the first scheduled communication includes delaying transmission of the first scheduled communication based at least in part on a random backoff value within a backoff window.

In a fifth aspect, alone or in combination with one or more of the first through fourth aspects, delaying transmission of the first scheduled communication includes delaying transmission of the first scheduled communication based at least in part on a state of a backoff window state machine.

In a sixth aspect, alone or in combination with one or more of the first through fifth aspects, backing off from transmitting includes refraining from transmitting the first scheduled communication.

In a seventh aspect, alone or in combination with one or more of the first through sixth aspects, backing off from transmitting includes rescheduling the first scheduled communication with a lower rank than a rank associated with the first scheduling message.

In an eighth aspect, alone or in combination with one or more of the first through seventh aspects, backing off from transmitting includes rescheduling the first scheduled communication with fewer frequency domain resources than granted by the first scheduling message.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
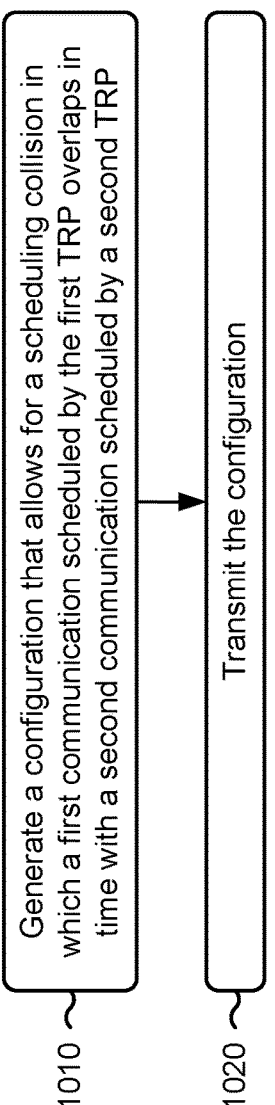
FIG. 10 is a diagram illustrating an example process performed, for example, by a first TRP, in accordance with the present disclosure.

FIG. 10 is a diagram illustrating an example process 1000 performed, for example, by a first TRP, in accordance with the present disclosure. Example process 1000 is an example where the first TRP (e.g., network node 110e, TRP 605) performs operations associated with collision handling for multiple TRPs.

As shown in FIG. 10, in some aspects, process 1000 may include generating a configuration that allows for a scheduling collision in which a first communication scheduled by the first TRP overlaps in time with a second communication scheduled by a second TRP (block 1010). For example, the first TRP (e.g., using communication manager 1206, depicted in FIG. 12) may generate a configuration that allows for a scheduling collision in which a first communication scheduled by the first TRP overlaps in time with a second communication scheduled by a second TRP, as described above.

As further shown in FIG. 10, in some aspects, process 1000 may include transmitting the configuration (block 1020). For example, the first TRP (e.g., using transmission component 1204 and/or communication manager 1206, depicted in FIG. 12) may transmit the configuration, as described above.

Process 1000 may include additional aspects, such as any single aspect or any combination of aspects described below and/or in connection with one or more other processes described elsewhere herein.

In a first aspect, the configuration indicates one or more of a set of resources for which scheduling collisions are allowed or a set of resources for which scheduling collisions are not allowed.

In a second aspect, alone or in combination with the first aspect, the configuration indicates the set of resources for which scheduling collisions are allowed via one or more of a bitmap, a start slot index, or an end slot index.

In a third aspect, alone or in combination with one or more of the first and second aspects, the configuration indicates one or more collision events for the set of resources for which scheduling collisions are allowed.

In a fourth aspect, alone or in combination with one or more of the first through third aspects, the configuration indicates a backoff counter that operates during a backoff timer and that delays transmission of the first scheduled communication.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a diagram illustrating an example process 1100 performed, for example, by a UE, in accordance with the present disclosure. Example process 1100 is an example where the UE (e.g., UE 120, UE 620) performs operations associated with collision handling for multiple TRPs.

As shown in FIG. 11, in some aspects, process 1100 may include receiving a configuration that allows for a scheduling collision in which a first communication scheduled by a first TRP overlaps in time with a second communication scheduled by a second TRP (block 1110). For example, the UE (e.g., using reception component 1302 and/or communication manager 1306, depicted in FIG. 13) may receive a configuration that allows for a scheduling collision in which a first communication scheduled by a first TRP overlaps in time with a second communication scheduled by a second TRP, as described above.

As further shown in FIG. 11, in some aspects, process 1100 may include applying the configuration for a set of resources for which scheduling collisions are allowed and not applying the configuration for a set of resources for which scheduling collisions are not allowed (block 1120). For example, the UE (e.g., using communication manager 1306, depicted in FIG. 13) may apply the configuration for a set of resources for which scheduling collisions are allowed and not applying the configuration for a set of resources for which scheduling collisions are not allowed, as described above.

Process 1100 may include additional aspects, such as any single aspect or any combination of aspects described below and/or in connection with one or more other processes described elsewhere herein.

In a first aspect, the configuration indicates the set of resources for which scheduling collisions are allowed via one or more of a bitmap, a start slot index, or an end slot index.

In a second aspect, alone or in combination with the first aspect, the configuration indicates one or more collision events for the set of resources for which scheduling collisions are allowed.

In a third aspect, alone or in combination with one or more of the first and second aspects, the configuration indicates a backoff counter that operates during a backoff timer and that delays transmission of the first scheduled communication, and process 1100 includes starting the backoff timer and the backoff counter upon detection of a scheduling collision.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
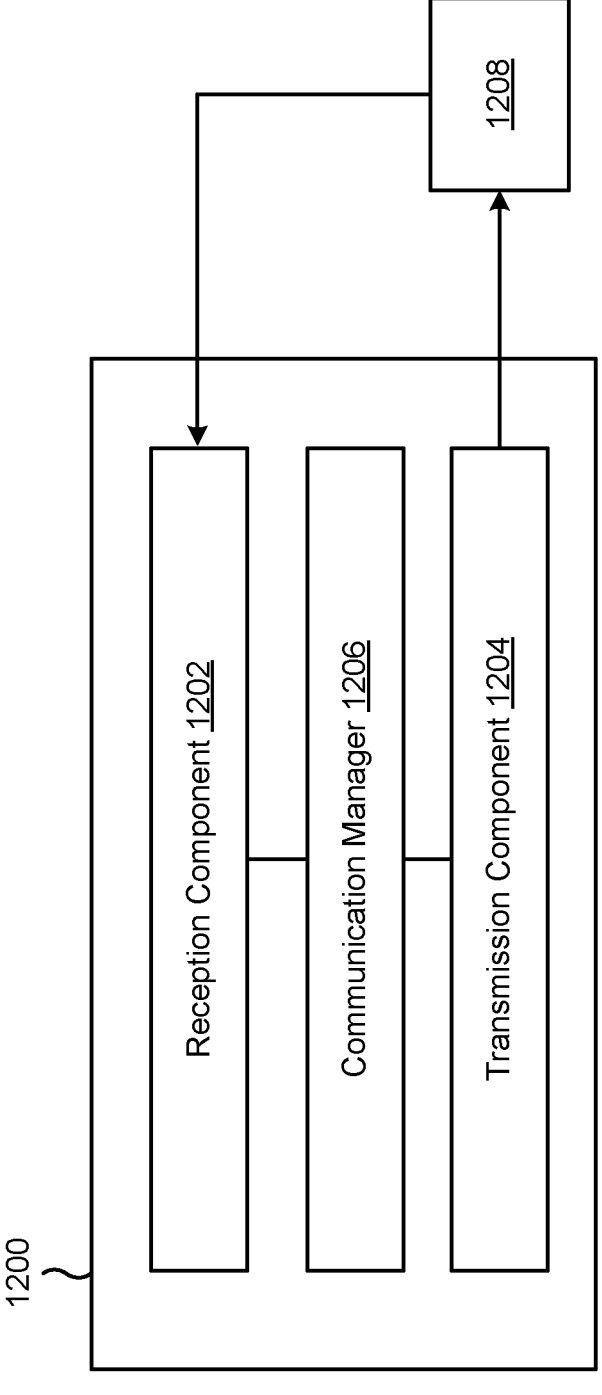
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a first TRP (e.g., network node 110c, TRP 605), or a first TRP may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 150 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIGS. 1-8. Additionally, or alternatively, the apparatus 1200 may be configured to perform one or more processes described herein, such as process 900 of FIG. 9, process 1000 of FIG. 10, or a combination thereof. In some aspects, the apparatus 1200 and/or one or more components shown in FIG. 12 may include one or more components of the first TRP described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the first TRP described in connection with FIG. 2. In some aspects, the reception component 1202 and/or the transmission component 1204 may include or may be included in a network interface. The network interface may be configured to obtain and/or output signals for the apparatus 1200 via one or more communications links, such as a backhaul link, a midhaul link, and/or a fronthaul link.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, a modem, a modulator, a transmit MIMO processor, a transmit processor, a controller/processor, a memory, or a combination thereof, of the first TRP described in connection with FIG. 2. In some aspects, the transmission component 1204 may be co-located with the reception component 1202 in a transceiver.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

In some aspects, the reception component 1202 may receive an indication of a detection of a scheduling collision of a first scheduled communication of a first scheduling message from the first TRP and a second scheduled communication of a second scheduling message from a second TRP. The communication manager 1206 and the transmission component 1204 may back off from transmitting the first scheduled communication based at least in part on the indication.

In some aspects, the communication manager 1206 may generate a configuration that allows for a scheduling collision in which a first communication scheduled by the first TRP overlaps in time with a second communication scheduled by a second TRP. The transmission component 1204 may transmit the configuration.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
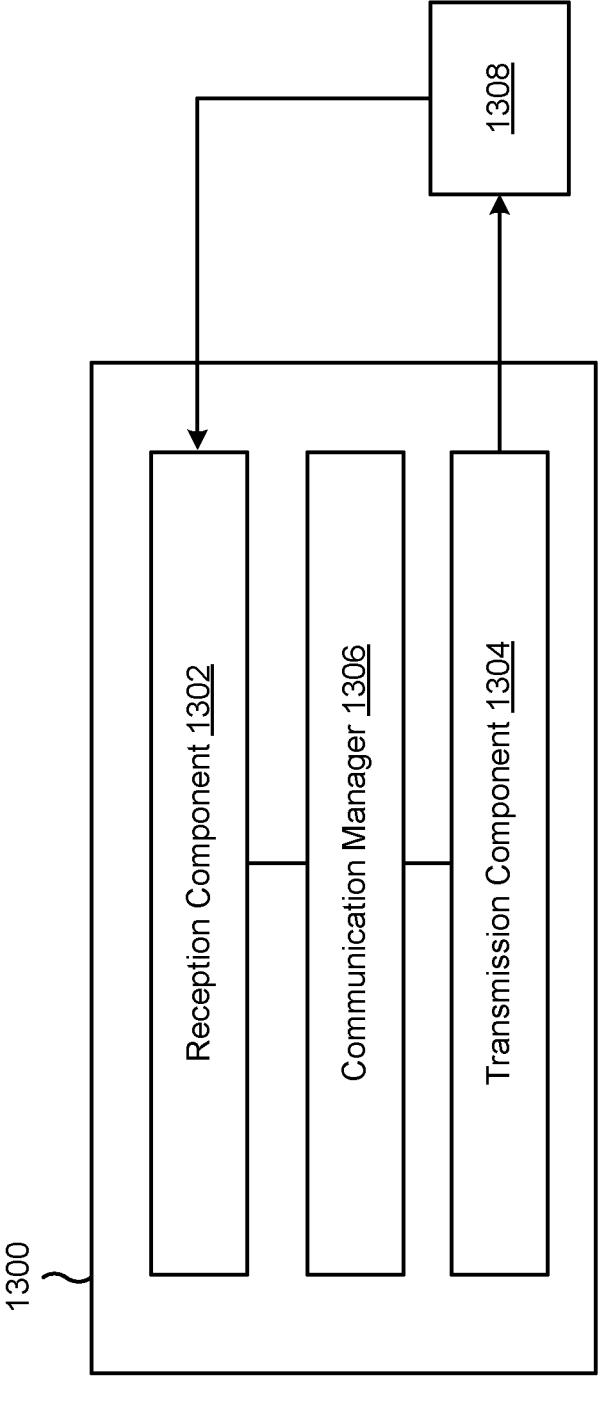
FIG. 13 is a diagram of an example apparatus for wireless communication, in accordance with the present disclosure.

FIG. 13 is a diagram of an example apparatus 1300 for wireless communication, in accordance with the present disclosure. The apparatus 1300 may be a UE (e.g., UE 120, UE 620), or a UE may include the apparatus 1300. In some aspects, the apparatus 1300 includes a reception component 1302, a transmission component 1304, and/or a communication manager 1306, which may be in communication with one another (for example, via one or more buses and/or one or more other components). In some aspects, the communication manager 1306 is the communication manager 140 described in connection with FIG. 1. As shown, the apparatus 1300 may communicate with another apparatus 1308, such as a UE or a network node (such as a CU, a DU, an RU, or a base station), using the reception component 1302 and the transmission component 1304.

In some aspects, the apparatus 1300 may be configured to perform one or more operations described herein in connection with FIGS. 1-8. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1308. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1308. In some aspects, one or more other components of the apparatus 1300 may generate communications and may provide the generated communications to the transmission component 1304 for transmission to the apparatus 1308. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1308. In some aspects, the transmission component 1304 may include one or more antennas, a modem, a modulator, a transmit MIMO processor, a transmit processor, a controller/processor, a memory, or a combination thereof, of the UE described in connection with FIG. 2. In some aspects, the transmission component 1304 may be co-located with the reception component 1302 in a transceiver.

The communication manager 1306 may support operations of the reception component 1302 and/or the transmission component 1304. For example, the communication manager 1306 may receive information associated with configuring reception of communications by the reception component 1302 and/or transmission of communications by the transmission component 1304. Additionally, or alternatively, the communication manager 1306 may generate and/or provide control information to the reception component 1302 and/or the transmission component 1304 to control reception and/or transmission of communications.

The reception component 1302 may receive a configuration that allows for a scheduling collision in which a first communication scheduled by a first TRP overlaps in time with a second communication scheduled by a second TRP. The communication manager 1306 may apply the configuration for a set of resources for which scheduling collisions are allowed and not applying the configuration for a set of resources for which scheduling collisions are not allowed.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The foregoing disclosure provides illustration and description but is not intended to be exhaustive or to limit the aspects to the precise forms disclosed. Modifications and variations may be made in light of the above disclosure or may be acquired from practice of the aspects.

The following provides an overview of some Aspects of the present disclosure:

Aspect 1: A method of wireless communication performed by a first transmit receive point (TRP) of a network entity, comprising: receiving an indication of a detection of a scheduling collision of a first scheduled communication of a first scheduling message from the first TRP and a second scheduled communication of a second scheduling message from a second TRP; and backing off from transmitting the first scheduled communication based at least in part on the indication.

Aspect 2: The method of Aspect 1, wherein backing off from transmitting includes delaying transmission of the first scheduled communication.

Aspect 3: The method of Aspect 2, wherein delaying transmission of the first scheduled communication includes delaying transmission of the first scheduled communication based at least in part on a configured backoff window.

Aspect 4: The method of Aspect 3, further comprising increasing or decreasing the configured backoff window.

Aspect 5: The method of Aspect 2, wherein delaying transmission of the first scheduled communication includes delaying transmission of the first scheduled communication based at least in part on a random backoff value within a backoff window.

Aspect 6: The method of Aspect 2, wherein delaying transmission of the first scheduled communication includes delaying transmission of the first scheduled communication based at least in part on a state of a backoff window state machine.

Aspect 7: The method of any of Aspects 1-6, wherein backing off from transmitting includes refraining from transmitting the first scheduled communication.

Aspect 8: The method of any of Aspects 1-7, wherein backing off from transmitting includes rescheduling the first scheduled communication with a lower rank than a rank associated with the first scheduling message.

Aspect 9: The method of any of Aspects 1-8, wherein backing off from transmitting includes rescheduling the first scheduled communication with fewer frequency domain resources than granted by the first scheduling message.

Aspect 10: A method of wireless communication performed by a first transmit receive point (TRP) of a network entity, comprising: generating a configuration that allows for a scheduling collision in which a first communication scheduled by the first TRP overlaps in time with a second communication scheduled by a second TRP; and transmitting the configuration.

Aspect 11: The method of Aspect 10, wherein the configuration indicates one or more of a set of resources for which scheduling collisions are allowed or a set of resources for which scheduling collisions are not allowed.

Aspect 12: The method of Aspect 11, wherein the configuration indicates the set of resources for which scheduling collisions are allowed via one or more of a bitmap, a start slot index, or an end slot index.

Aspect 13: The method of Aspect 11 or 12, wherein the configuration indicates one or more collision events for the set of resources for which scheduling collisions are allowed.

Aspect 14: The method of any of Aspects 11-13, wherein the configuration indicates a backoff counter that operates during a backoff timer and that delays transmission of the first communication.

Aspect 15: A method of wireless communication performed by a user equipment (UE), comprising: receiving a configuration that allows for a scheduling collision in which a first communication scheduled by a first transmit receive point (TRP) overlaps in time with a second communication scheduled by a second TRP; and applying the configuration for a set of resources for which scheduling collisions are allowed and not applying the configuration for a set of resources for which scheduling collisions are not allowed.

Aspect 16: The method of Aspect 15, wherein the configuration indicates the set of resources for which scheduling collisions are allowed via one or more of a bitmap, a start slot index, or an end slot index.

Aspect 17: The method of any of Aspects 15-16, wherein the configuration indicates one or more collision events for the set of resources for which scheduling collisions are allowed.

Aspect 18: The method of any of Aspects 15-17, wherein the configuration indicates a backoff counter that operates during a backoff timer and that delays transmission of the first communication, and wherein the method includes starting the backoff timer and the backoff counter upon detection of a scheduling collision.

Aspect 19: An apparatus for wireless communication at a device, comprising a processor; memory coupled with the processor; and instructions stored in the memory and executable by the processor to cause the apparatus to perform the method of one or more of Aspects 1-18.

Aspect 20: A device for wireless communication, comprising a memory and one or more processors coupled to the memory, the one or more processors configured to perform the method of one or more of Aspects 1-18.

Aspect 21: An apparatus for wireless communication, comprising at least one means for performing the method of one or more of Aspects 1-18.

Aspect 22: A non-transitory computer-readable medium storing code for wireless communication, the code comprising instructions executable by a processor to perform the method of one or more of Aspects 1-18.

Aspect 23: A non-transitory computer-readable medium storing a set of instructions for wireless communication, the set of instructions comprising one or more instructions that, when executed by one or more processors of a device, cause the device to perform the method of one or more of Aspects 1-18.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first transmit receive point (TRP) for wireless communication, comprising:

a memory; and one or more processors, coupled to the memory, configured to:

generate a configuration indicating an assignment of one or more collision sets, wherein the assignment allows for a scheduling collision in which a first communication scheduled by the first TRP overlaps in time with a second communication scheduled by a second TRP, and wherein the assignment is based at least in part on a collision probability and a trunking efficiency; and transmit the configuration.

2. The first TRP of claim 1, wherein the one or more collision sets correspond to one or more of a set of resources for which scheduling collisions are allowed.

3. The first TRP of claim 2, wherein the configuration indicates the set of resources for which scheduling collisions are allowed via one or more of a bitmap, a start slot index, or an end slot index.

4. The first TRP of claim 2, wherein the configuration indicates one or more collision events for the set of resources for which scheduling collisions are allowed.

5. The first TRP of claim 1, wherein the configuration indicates a backoff counter that operates during a backoff timer and that delays transmission of the first communication.

6. A user equipment (UE) for wireless communication, comprising:

a memory; and one or more processors, coupled to the memory, configured to:

receive a configuration indicating an assignment of one or more collision sets, wherein the assignment allows for a scheduling collision in which a first communication scheduled by a first transmit receive point (TRP) overlaps in time with a second communication scheduled by a second TRP, and wherein the assignment is based at least in part on a collision probability and a trunking efficiency; and apply the configuration for a set of resources for which scheduling collisions are allowed and not applying the configuration for a set of resources for which scheduling collisions are not allowed.

7. The UE of claim 6,
wherein the configuration indicates the set of resources
for which scheduling collisions are allowed via one or
more of a bitmap, a start slot index, or an end slot index.

8. The UE of claim 6,
wherein the configuration indicates one or more collision
events for the set of resources for which scheduling
collisions are allowed.

9. The UE of claim 6,
wherein the configuration indicates a backoff counter that
operates during a backoff timer and that delays trans-
mission of the first communication, and wherein the
one or more processors are configured to start the
backoff timer and the backoff counter upon detection of
a scheduling collision.

10. The UE of claim 6,
wherein the configuration indicates slots for one or more
collision sets and one or more coordination sets.

11. The first TRP of claim 1,
wherein the configuration further indicates another
assignment of one or more coordination sets, wherein
the one or more coordination sets correspond to one or
more of another set of resources for which scheduling
collisions are allowed.

12. The first TRP of claim 11,
wherein the configuration indicates a starting slot and an
ending slot for the one or more collision sets and a
starting slot and an ending slot for the one or more
coordination sets.

13. The first TRP of claim 5,
wherein the one or more processors are configured to start
the backoff timer and the backoff counter upon detec-
tion of a scheduling collision.

14. A non-transitory computer-readable medium storing a
set of instructions for wireless communication, the set of
instructions comprising:
one or more instructions that, when executed by one or
more processors of a first transmit receive point (TRP),
cause the the first TRP to:

generate a configuration indicating an assignment of
one or more collision sets, wherein the assignment
allows for a scheduling collision in which a first
communication scheduled by the first transmit
receive point (TRP) overlaps in time with a second
communication scheduled by a second TRP, and
wherein the assignment is based at least in part on a
collision probability and a trunking efficiency; and
transmit the configuration.

15. The non-transitory computer-readable medium of
claim 14,
wherein the one or more collision sets correspond to one
or more of a set of resources for which scheduling
collisions are allowed.

16. The non-transitory computer-readable medium of
claim 15,
wherein the configuration indicates the set of resources
for which scheduling collisions are allowed via one or
more of a bitmap, a start slot index, or an end slot index.

17. The non-transitory computer-readable medium of
claim 15,
wherein the configuration indicates one or more collision
events for the set of resources for which scheduling
collisions are allowed.

18. The non-transitory computer-readable medium of
claim 14,
wherein the configuration indicates slots for one or more
collision sets and one or more coordination sets.

19. The non-transitory computer-readable medium of
claim 14,
wherein the configuration indicates a backoff counter that
operates during a backoff timer and that delays trans-
mission of the first communication.

20. The non-transitory computer-readable medium of
claim 19,
wherein the one or more instructions further cause the first
TRP to start the backoff timer and the backoff counter
upon detection of a scheduling collision.

* * * * *